Patented Sept. 23, 1930

1,776,669

UNITED STATES PATENT OFFICE

KARL SCHÖLLKOPF, OF DUSSELDORF-OBERKASSEL, AND ARTHUR SERINI, OF DUSSELDORF-HEERDT, GERMANY, ASSIGNORS TO RHEINISCHE KAMPFER-FABRIK GESELLSCHAFT MIT BESCHRANKTER HAFTUNG, OF DUSSELDORF-OBERKASSEL, GERMANY

PROCESS FOR MAKING INACTIVE MENTHOL

No Drawing. Original application filed June 30, 1927, Serial No. 202,739, and in Germany February 15, 1927. Divided and this application filed September 20, 1928. Serial No. 307,333.

This is a process for the production of inactive menthol, new isomer of inactive menthol and making the same, being a divisional application of application Serial No. 202,739 filed June 30th, 1927.

This process for the production of inactive menthol, the racemate of natural menthol consists in subjecting inactive neo-isomenthol (melting point 12-14°) acid-phthalate melting point 90-92° C. to hydrogenating catalysts with heat in the presence of hydrogen with or without pressure, so that an isomerization results and treating the menthols mixture with refrigeration, or fractional distillation, so that fixed inactive menthol is obtained which is purified by crystallizing the esters or acid esters.

It is possible to isomerize inactive neo-isomenthol alone or in mixtures with other substances as for instance with inactive isomenthol having a melting point of 53° C. Catalyzers suggested for hydrogenation as well as isomerization according to the process herein described is nickel, cobalt, copper, platinum, palladium or mixtures of these in powdered form or used with carriers such as kieselguhr, asbestos, pumice stone, barium-sulphate and similar materials. Instead of metals, the oxygen compounds can be used or the carbonaceous compounds such as carbonates and formiates which are easily decomposed.

The crude inactive menthol which is obtained according to this described process can be purified e. g. it can be transformed into esters such as ester of paranitrobenzoic acid, carbonate, borate, acid- phthalate or -succinate, these being recrystallized and then saponified as pure esters or acid esters as described in the U. S. Patent No. 1,672,346.

Example 100 kilograms of inactive neo-isomenthol are treated with 2 kilograms of a nickel and copper catalyst under a pressure of about 10 atmospheres of hydrogen at a temperature of 180° C. with agitation until an equilibrium of transformation that is to say until a maximum yield of inactive menthol is obtained which usually takes about 24 hours. From the mixture of isomers the crude inactive menthol is obtained through recrystallization or fractional distillation or by a combination of both methods and further purified by transformation into the crystallized esters. In this way pure inactive menthol of a melting point 34-36° C. is obtained.

The isomers of the inactive menthol which are obtained in this process of separation and purification can be again treated, eventually with the addition of fresh inactive neo-isomenthol.

We claim—

1. The process for manufacturing inactive menthol, the racemate of natural menthol, which consists in heating inactive neo-isomenthol with hydrogenating catalysts and hydrogen under pressure and agitation and separating from the reaction product the obtained crude inactive menthol.

2. The process for manufacturing inactive menthol, the racemate of natural menthol, which consists in heating inactive neo-isomenthol admixed with materials which are capable of being hydrogenated to inactive menthols mixtures with hydrogenating catalysts and hydrogen under pressure and agitation and separating from the reaction product the obtained crude inactive menthol.

3. The process for manufacturing inactive menthol, the racemate of natural menthol, which consists in heating inactive neo-isomenthol admixed with other isomers of inactive menthol with hydrogenating catalysts and hydrogen under agitation and separating from the reaction product the obtained crude inactive menthol.

4. The process for manufacturing inactive menthol, the racemate of natural menthol, which consists in heating inactive neo-isomenthol with hydrogenating catalysts and hydrogen under agitation, and separating from the reaction product crude inactive menthol.

5. The process for manufacturing inactive menthol, the racemate of natural menthol, which consists in heating inactive neo-isomenthol with hydrogenating catalysts and hydrogen under agitation and separating from the reaction product crude inactive menthol by physical methods.

6. The process for manufacturing inactive menthol, the racemate of natural menthol, which consists in heating inactive neo-isomenthol with hydrogenating catalysts and hydrogen under agitation and separating from the reaction product crude inactive menthol by fractional distillation.

7. The process for manufacturing inactive menthol, the racemate of natural menthol, which consists in heating inactive neo-isomenthol with hydrogenating catalysts and hydrogen under pressure and agitation and separating from the reaction product the obtained crude inactive menthol by physical methods.

8. The process for manufacturing inactive menthol, the racemate of natural menthol, which consists in heating inactive neo-isomenthol with hydrogenating catalysts and hydrogen under pressure and agitation and separating from the reaction product the obtained crude inactive menthol by fractional distillation.

9. The process for manufacturing inactive menthol, the racemate of natural menthol, which consists in heating inactive neo-isomenthol, mixed with materials which are capable of being hydrogenated to inactive menthol mixtures, with hydrogenating catalysts and hydrogen under pressure and agitation and separating from the reaction product crude inactive menthol by physical methods.

10. The process for manufacturing inactive menthol, the racemate of natural menthol, which consists in heating inactive neo-isomenthol, mixed with materials which are capable of being hydrogenated to inactive menthol mixtures, with hydrogenating catalysts and hydrogen under pressure and agitation and separating from the reaction product crude inactive menthol by fractional distillation.

11. The process for manufacturing inactive menthol, the racemate of natural menthol, which consists in heating inactive neo-isomenthol mixed with other isomers of inactive menthol with hydrogenating catalysts and hydrogen under agitation and separating from the reaction product crude inactive menthol by physical methods.

12. The process for manufacturing inactive menthol, the racemate of natural menthol, which consists in heating inactive neo-isomenthol mixed with other isomers of inactive menthol with hydrogenating catalysts and hydrogen under agitation and separating from the reaction product crude inactive menthol by fractional distillation.

13. The process for manufacturing inactive menthol, the racemate of natural menthol, which consists in heating inactive neo-isomenthol with hydrogenating catalysts and hydrogen under agitation and separating from the reaction product crude inactive menthol by fractional crystallization.

14. The process for manufacturing inactive menthol, the racemate of natural menthol, which consists in heating inactive neo-isomenthol with hydrogenating catalysts and hydrogen under pressure and agitation and separating from the reaction product the obtained crude inactive menthol by fractional crystallization.

15. The process for manufacturing inactive menthol, the racemate of natural menthol, which consists in heating inactive neo-isomenthol mixed with materials which are capable of being hydrogenated to inactive menthol mixtures with hydrogenating catalysts and hydrogen under pressure and agitation and separating from the reaction product crude inactive menthol by fractional crystallization.

16. The process for manufacturing inactive menthol, the racemate of natural menthol, which consists in heating inactive neo-isomenthol mixed with other isomers of inactive menthol with hydrogenating catalysts and hydrogen under agitation and separating from the reaction product crude inactive menthol by fractional crystallization.

In testimony whereof we affix our signatures.

KARL SCHÖLLKOPF.
ARTHUR SERINI.